(12) United States Patent
Zerayohannes et al.

(10) Patent No.: US 9,671,877 B2
(45) Date of Patent: Jun. 6, 2017

(54) STYLUS TOOL WITH DEFORMABLE TIP

(71) Applicant: NVIDIA Corporation, Santa Clara, CA (US)

(72) Inventors: Berhanu Zerayohannes, Santa Clara, CA (US); Siarhei Murauyou, Santa Clara, CA (US); Tommy Lee, Danville, CA (US); Glenn Wernig, San Jose, CA (US); Nelson Au, Foster City, CA (US); Arman Toorians, San Jose, CA (US); Jen-Hsun Huang, Los Altos Hills, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 7 days.

(21) Appl. No.: 14/165,324

(22) Filed: Jan. 27, 2014

(65) Prior Publication Data

US 2015/0212601 A1    Jul. 30, 2015

(51) Int. Cl.
   *G06F 3/0354*      (2013.01)
(52) U.S. Cl.
   CPC .................... *G06F 3/03545* (2013.01)
(58) Field of Classification Search
   CPC .. G06F 3/03545; G06F 3/03546; G06F 3/041; B43K 8/003
   See application file for complete search history.

(56) References Cited

U.S. PATENT DOCUMENTS

| | | | |
|---|---|---|---|
| 5,877,459 A | 3/1999 | Prater | |
| 5,914,708 A | 6/1999 | LaGrange et al. | |
| 5,995,081 A | 11/1999 | Kato | |
| 8,648,837 B1* | 2/2014 | Tran | G06F 3/0416 178/19.01 |
| 8,878,823 B1* | 11/2014 | Kremin et al. | 345/179 |
| 9,213,424 B1* | 12/2015 | Dunn | G06F 3/03545 |
| 2003/0107607 A1 | 6/2003 | Nguyen | |
| 2004/0100457 A1 | 5/2004 | Mandle | |
| 2004/0212586 A1 | 10/2004 | Denny, III | |
| 2007/0103455 A1 | 5/2007 | Omata et al. | |
| 2008/0284745 A1 | 11/2008 | Kao et al. | |
| 2009/0167727 A1* | 7/2009 | Liu et al. | 345/179 |
| 2009/0262637 A1* | 10/2009 | Badaye et al. | 369/126 |
| 2010/0051356 A1 | 3/2010 | Stern et al. | |
| 2010/0085325 A1 | 4/2010 | King-Smith et al. | |
| 2010/0170726 A1 | 7/2010 | Yeh et al. | |
| 2010/0315384 A1 | 12/2010 | Hargreaves et al. | |
| 2011/0169756 A1 | 7/2011 | Ogawa et al. | |

(Continued)

*Primary Examiner* — Kumar Patel
*Assistant Examiner* — Amy C Onyekaba

(57) ABSTRACT

A passive stylus with a deformable tip is described herein. In one embodiment, a thin annular body configured to be hand-held with a chisel shaped tip disposed at the first end of the body is provided. The chisel shaped tip includes a deformable material such that the chisel shaped tip is operable to interface with a touch a sensitive surface with a detectable surface area when a first pressure is exerted on the body and translated to the chisel shaped tip. The chisel shaped tip is operable to interface with the touch sensitive surface with a second detectable surface area, this one different from the first detectable surface area, when a second pressure is exerted on the body and translated to the chisel shaped tip. The stylus may include a second tip on the back end for providing an erase function.

24 Claims, 15 Drawing Sheets

(56) References Cited

U.S. PATENT DOCUMENTS

| | | |
|---|---|---|
| 2011/0261026 A1 | 10/2011 | Kim et al. |
| 2011/0273376 A1 | 11/2011 | Dickinson et al. |
| 2011/0304577 A1* | 12/2011 | Brown et al. .................. 345/174 |
| 2012/0146957 A1 | 6/2012 | Dunagan |
| 2012/0154324 A1 | 6/2012 | Wright et al. |
| 2012/0223894 A1 | 9/2012 | Zhao et al. |
| 2012/0327041 A1 | 12/2012 | Harley et al. |
| 2012/0327045 A1 | 12/2012 | Skinner |
| 2013/0009907 A1* | 1/2013 | Rosenberg et al. ............ 345/174 |
| 2013/0044078 A1 | 2/2013 | Hallenberg et al. |
| 2013/0082937 A1 | 4/2013 | Liu et al. |
| 2013/0100071 A1 | 4/2013 | Wright et al. |
| 2013/0135191 A1 | 5/2013 | Shiokawa |
| 2013/0194242 A1* | 8/2013 | Park et al. ..................... 345/179 |
| 2013/0249823 A1 | 9/2013 | Ahn et al. |
| 2014/0028633 A1 | 1/2014 | Mercea et al. |
| 2014/0043245 A1 | 2/2014 | Dowd et al. |
| 2014/0160091 A1 | 6/2014 | Mann |
| 2014/0168142 A1 | 6/2014 | Sasselli et al. |
| 2014/0168177 A1 | 6/2014 | Mkrtchyan et al. |
| 2014/0176495 A1 | 6/2014 | Vlasov |
| 2014/0253464 A1 | 9/2014 | Hicks et al. |
| 2014/0267078 A1 | 9/2014 | Kukulski et al. |
| 2014/0267180 A1 | 9/2014 | Buelow et al. |
| 2014/0267187 A1 | 9/2014 | Cooke |
| 2014/0267192 A1 | 9/2014 | Matsuura et al. |
| 2014/0306929 A1 | 10/2014 | Huang et al. |
| 2015/0015497 A1 | 1/2015 | Leigh |
| 2015/0029163 A1* | 1/2015 | Harris et al. ................... 345/179 |
| 2015/0091815 A1* | 4/2015 | Michaelis ..................... 345/173 |

\* cited by examiner

STYLUS TOOL WITH DEFORMABLE TIP

FIELD OF THE INVENTION

Embodiments of the present invention relate to stylus tools for use with touch sensitive computer display devices.

BACKGROUND

There is a growing need in the field of touchscreen devices to enable user interaction with the touchscreen device in such a way that subtle variations in the tilt, angle, and pressure of an input device are recognized by the system without adding complexity and costs to the input device itself. The input device is typically a stylus tool. Stylus design is generally broken down into two categories: active and passive. Active stylus design requires additional active (powered) electronic circuitry within the stylus. Passive stylus tools do not have such powered electronic circuitry and are of a simpler design.

Some prior art input devices, such as accelerometer or position based styluses, and digital pens, are only capable of binary input, e.g., the detection system is only capable of recognizing the mere presence or absence of input. These prior art devices are incapable of detecting variations in the tilt, angle, and pressure of the stylus relative to the touchscreen surface.

One prior art approach requires a special flat panel detection layer integrated within the display unit to sense the stylus. The special detection layer is able to detect the position of the stylus, with the stylus having an active transmitter that electronically interfaces with the layer. This approach requires an active stylus, e.g., one that has active and powered circuitry for interfacing with the special touch sensitive layer. The requirement of a special flat panel detection layer and the requirement of having an active stylus both add cost and complexity to this approach.

Other digital pens have relied on accelerometers or Bluetooth communication between devices to detect the presence and position of input from the digital pen. These approaches require an active stylus. While some of these devices are capable of detecting variations in pressure applied using the stylus, such implementations are complex and cannot accurately detect variations in the angle and tilt of the input device. This result is achieved by detecting pressure at the input device itself, rather than detecting pressure at the touchscreen. These implementations also require that the input device and touchscreen device are in constant communication, typically over Bluetooth (or some other radio pathway), which adds device complexity and strains device battery life.

Other prior art solutions include camera based pens which use special digital paper featuring a non-uniform dot pattern printed on the surface. As the camera detects the position of the pen relative to the dot pattern, the presence and position of input is determined. However, this implementation requires an expensive and complex electronic pen with a dedicated (active) power source.

SUMMARY

Recent advances in touchscreen technology have enabled the production of high resolution digitizers capable of sensing very small points of contacts that could not be reliably detected in the past. As such, input devices may take advantage of the high degree of precision offered by modern digitizers in next-generation touch screen systems. Input devices and high resolution digitizers capable of detecting subtle variations in input advantageously offer a more natural and familiar experience to users. These systems offer an experience similar to using a physical pen, pencil, paint brush, or other physical writing implement with a high degree of precision and relatively low production costs. Embodiments of the present invention are directed to passive stylus design that offers the above stated natural and familiar writing style while advantageously offering a low cost design.

Accordingly, a passive stylus with a deformable tip is described herein. In one embodiment, a thin annular body configured to be hand-held with a chisel shaped tip disposed at the first end of the body is provided. The chisel shaped tip includes a deformable material such that the chisel shaped tip is operable to interface with a touch a sensitive surface with a detectable surface area when a first pressure is exerted on the body and translated to the chisel shaped tip. Furthermore, the chisel shaped tip is operable to interface with the touch sensitive surface with a second detectable surface area, this one different from the first detectable surface area, when a second pressure is exerted on the body and translated to the chisel shaped tip.

In another embodiment, a second tip disposed within the second end of the body is provided. The second tip is larger than the chisel shaped tip and includes a first rubber material that is conductive and a second rubber material that is non-conductive. Both rubber materials are operable for directly interfacing with the touch sensitive surface when the second tip is positioned thereon.

In another embodiment, the chisel tip is operable to be used for generating graphically rendered writings by interfacing with the touch sensitive surface of an electronic device, and the second tip is operable to be used for electronically erasing graphically rendered writings by interfacing with the touch sensitive surface.

In another embodiment for providing a passive stylus, a tube is disclosed with a metal rod disposed within the tube. A metal tip holder is coupled to a first end of the metal rod, and a chisel shaped tip including a deformable conductive material is coupled to the metal tip holder. The chisel shaped tip is for interacting with a touch sensitive display device of a computer system. Furthermore, a tip housing covering a portion of the chisel shaped tip and coupled to a first end of the tube is provided, wherein the tip housing holds the chisel shaped tip in place. A cap is disposed within a second end of the tube and coupled to the other end of the metal rod.

In yet another embodiment for providing a passive stylus, a rod is disclosed with a chisel shaped tip including a deformable material coupled to the first end of the rod. The chisel shaped tip causes a first action when brought in contact with a touch sensitive surface. An oval shaped tip larger than said chisel shaped tip is provided and coupled to the second end of the rod. The oval shaped tip causes a second action when brought in contact with a touch sensitive surface.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
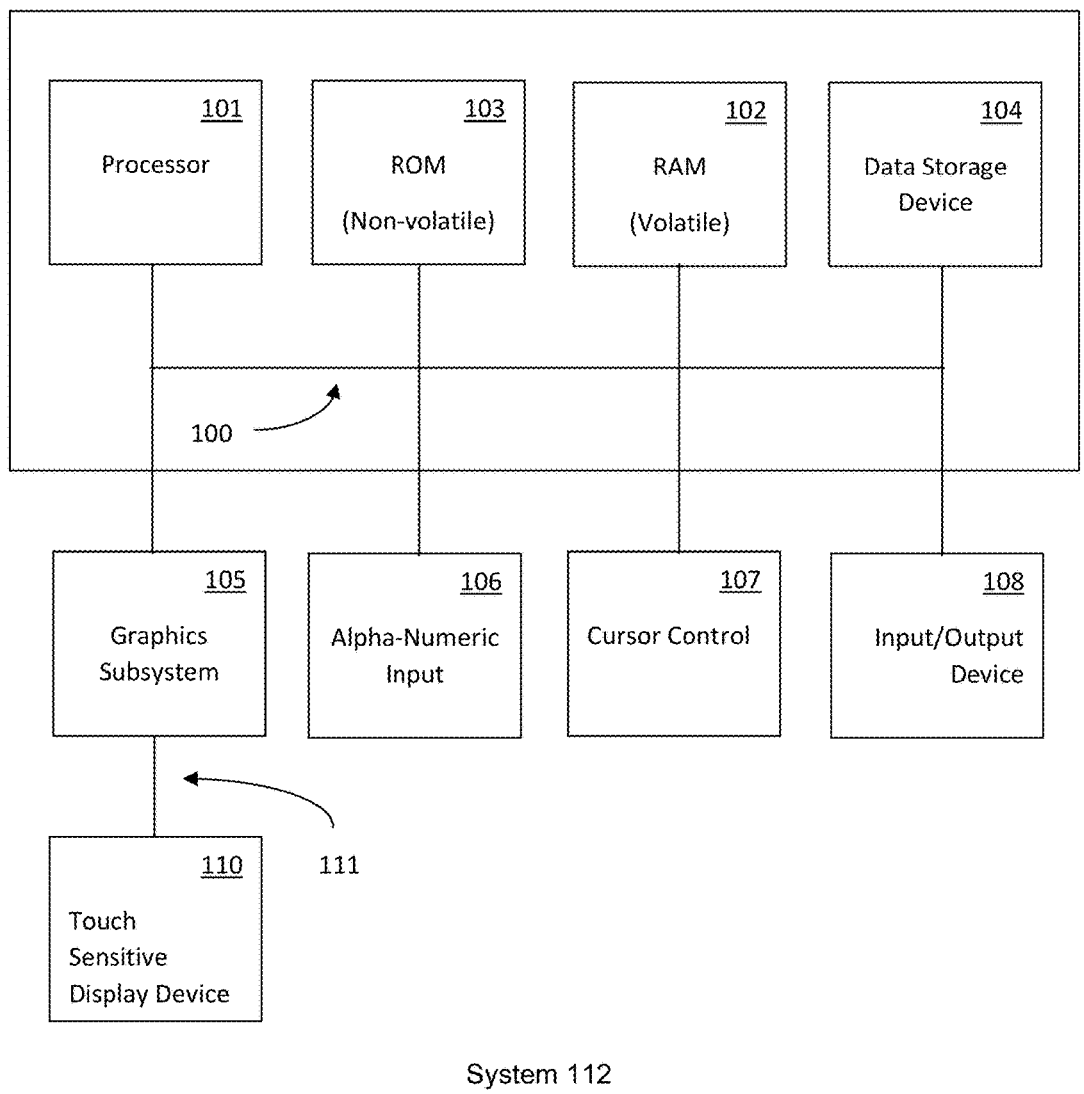
FIG. 1 is a block diagram of an exemplary computer system upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System with Touch Screen

Embodiments of the present invention are drawn to stylus devices that are intended to be used in combination with a computer system having a touch sensitive screen. In certain applications, the computer system can also be operating with a drawing application allowing the user to create electronic writings on the touch screen by "writing" on the touch screen using the stylus. In addition, writings can also be erased using an erase tip on the stylus. The following discussion describes one such general purpose computer system.

In the example of FIG. 1, the computer system 112 includes a central processing unit (CPU) 101 for running software applications and optionally an operating system. Memory 102/103 stores applications and data for use by the CPU 101. Storage 104 provides non-volatile storage for applications and data and may include fixed disk drives, removable disk drives, flash memory devices, and CD-ROM, DVD-ROM or other optical storage devices. The optional user inputs 106 and 107 include devices that communicate user inputs from one or more users to the computer system 112 and may include keyboards, mice, joysticks, touch screens, and/or microphones.

A communication or network interface 108 allows the computer system 112 to communicate with other computer systems via an electronic communications network, including wired and/or wireless communication and including an Intranet or the Internet. The touch sensitive display device 110 may be any device capable of displaying visual information in response to a signal from the computer system 112 and may include a flat panel touch sensitive display for interfacing with a stylus in accordance with embodiments of the present invention. The components of the computer system 112, including the CPU 101, memory 103/102, data storage 104, user input devices 106, and the touch sensitive display device 110, may be coupled via one or more data buses 100.

In the embodiment of FIG. 1, a graphics sub-system 105 may be coupled with the data bus and the components of the computer system 112. The graphics system may include a physical graphics processing unit (GPU) 105 and graphics memory. The GPU 105 generates pixel data for output images from rendering commands. The physical GPU 105 can be configured as multiple virtual GPUs that may be used in parallel (concurrently) by a number of applications or processes executing in parallel.

Some embodiments of the present invention may be described in, or in conjunction with, the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Stylus Input Device with Deformable Tip

Recent advances in high resolution digitizers used in modern touchscreen devices has enabled high resolution touch detection. Touch detection can be accomplished via styluses and digital pens. Embodiments of the present invention are drawn to a stylus design that supports additional functionality with high resolution touch panels without adding further complexity. The stylus device disclosed herein is a capacitive stylus intended for use with a touchscreen device (such as a tablet, for example) with a high resolution digitizer. The stylus design disclosed herein allows the user to draw lines and write text with line-weight variability by detecting changes in pressure on the stylus exerted by the user which is translated as a variable contact area on the screen. This functionality is achieved without adding any significant complexity to the input device itself or to the touch panel as the writing tip of the stylus is compressible/deformable.

An advantage of embodiments of the present invention is to achieve line weight variability while writing and drawing without adding special electronics or power to the input device itself. This goal is achieved using a specialized conductive silicon tip featuring a unique tip shape. The conductive silicon tip is deformable and is comprised of silicon material that allows for flex and compression such that as the user applies more pressure to the stylus, the force between the silicon tip and the touchscreen causes the silicon tip to deform and flatten somewhat against the touch screen thereby varying its area of contact with the touch panel surface. As the silicon tip compresses and flattens against the touchscreen, the contact area between the silicon tip and the touchscreen increases. Likewise, as pressure is relieved, the tip reforms and the contact area decreases.

According to some embodiments, the thickness of the line or stroke rendered on the screen (in a drawing application) will increase in relation to the size of the contact area between the silicon tip and the touchscreen. This advantageously provides a very natural and familiar writing experience, much like writing on paper.

Figure 2:
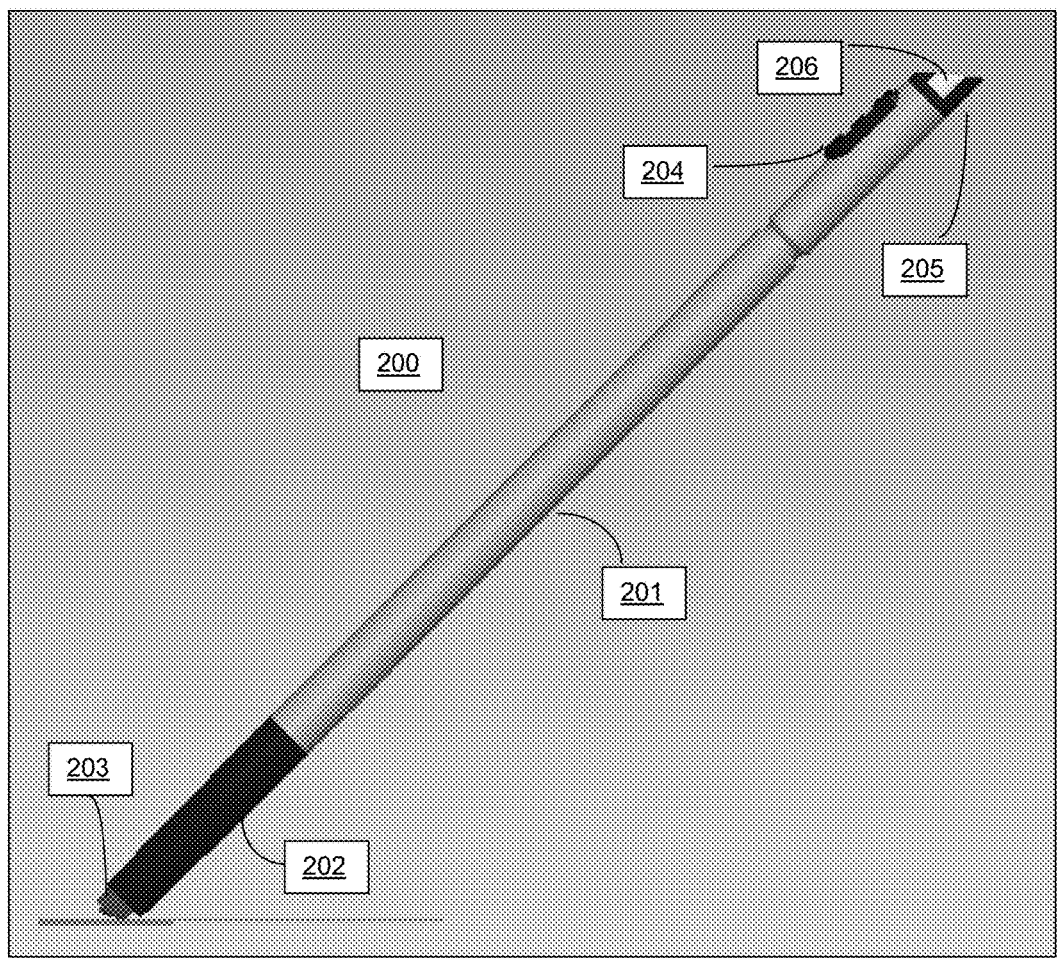
FIG. 2 is a diagram of an exemplary passive stylus input device with a chisel tip as assembled.

With reference now to FIG. 2, a diagram of an exemplary assembled passive stylus input device 200 is depicted, in accordance with one embodiment. The passive stylus 200 is intended to be used with a capacitive-based touch screen, e.g., a touch panel integrated with a flat panel display. While passive stylus input device 200 is shown as incorporating specific, enumerated features, it is understood that embodiments are well suited to applications involving additional, fewer, or different features or arrangements.

As shown, passive stylus input device 200 includes thin annular body 201. The first end of thin annular body 201 is coupled to tip housing 202 such that tip housing 202 may easily be removed by the user. For example, according to some embodiments, the first end of thin annular body 201 and tip housing 202 may feature complementary threading such that annular body 201 may be inserted to tip housing 202 and rotated to achieve coupling. In this way, thin annular body 201 and tip housing 202 may be assembled and disassembled by the user easily and without using any tools. The other end of tip housing 202 is not threaded, but is tapered such that the diameter of the opening is smallest at the tip. Small conductive silicon tip 203 is inserted through the threaded end of tip housing 202 and pressed forward until a portion of small conductive silicon tip 203 is exposed. The silicon tip 203 is the writing end of the stylus 200 and is deformable.

In the embodiment depicted in FIG. 2, the second end of thin annular body 201 is coupled to a large conductive silicon tip 205. Large conductive silicon tip 205 comprises non-conductive cutaway 206 (depicted in greater detail in FIG. 6A). Silicon tip 205 may be either a second writing tip or may be used as an electronic eraser functionality. Raised tactile surface 204 is coupled to thin annular body 201 near large conductive silicon tip 205 and provides a finger hold so that the stylus input device 200 may be easily removed from storage.

Figure 3A:
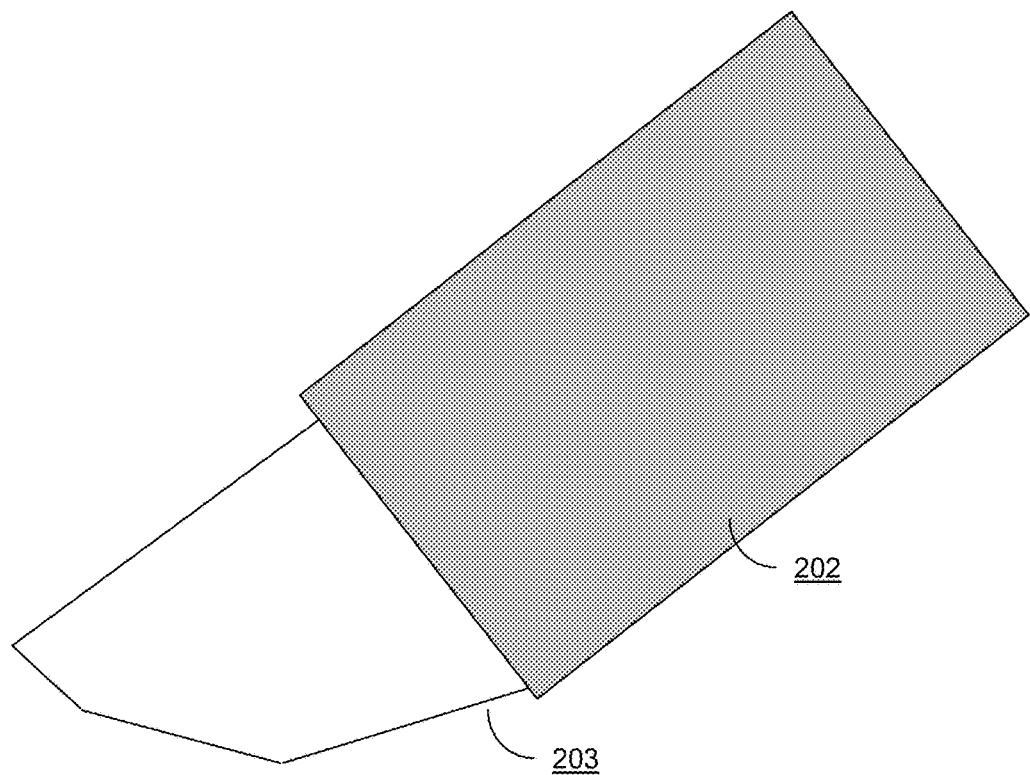
FIGS. 3A and 3B are diagrams of exemplary chisel shaped and round deformable silicon tips.
Figure 3B:
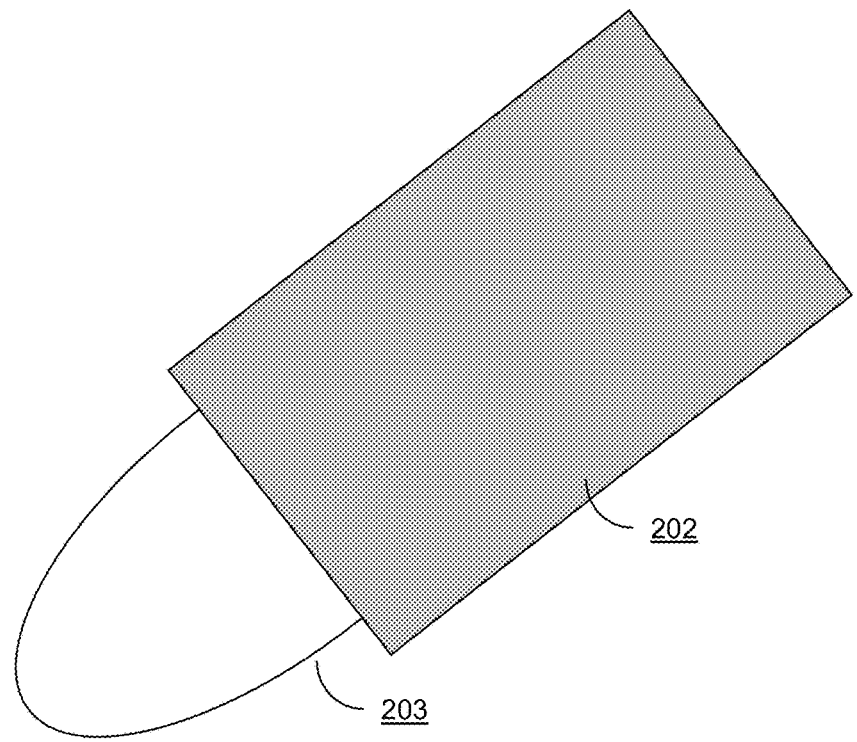

With reference now to FIGS. 3A and 3B, diagrams of exemplary deformable conductive tips are depicted, in accordance with some embodiment. As shown, tip housing 202 partially covers small conductive tip 203. In FIG. 3A, small conductive tip 203 is a chisel shaped tip. According to some embodiments, the chisel shaped tip is about 2 mm wide at the widest point, about 1 mm wide at the narrowest point, and between 5 mm and 6 mm long. According to some embodiments, the chisel shaped tip comprises a thin writing edge for interfacing with a touch sensitive surface with a thin detectable surface area, and a thick writing surface adjacent to the thin writing edge for interfacing with a touch sensitive surface with a thick detectable surface area (larger than the thin detectable surface area). In FIG. 3B, small conductive tip 203 is a round tip, also called a fine tip. According to some embodiments, the round tip is about 2 mm wide at its widest point.

Figure 4:
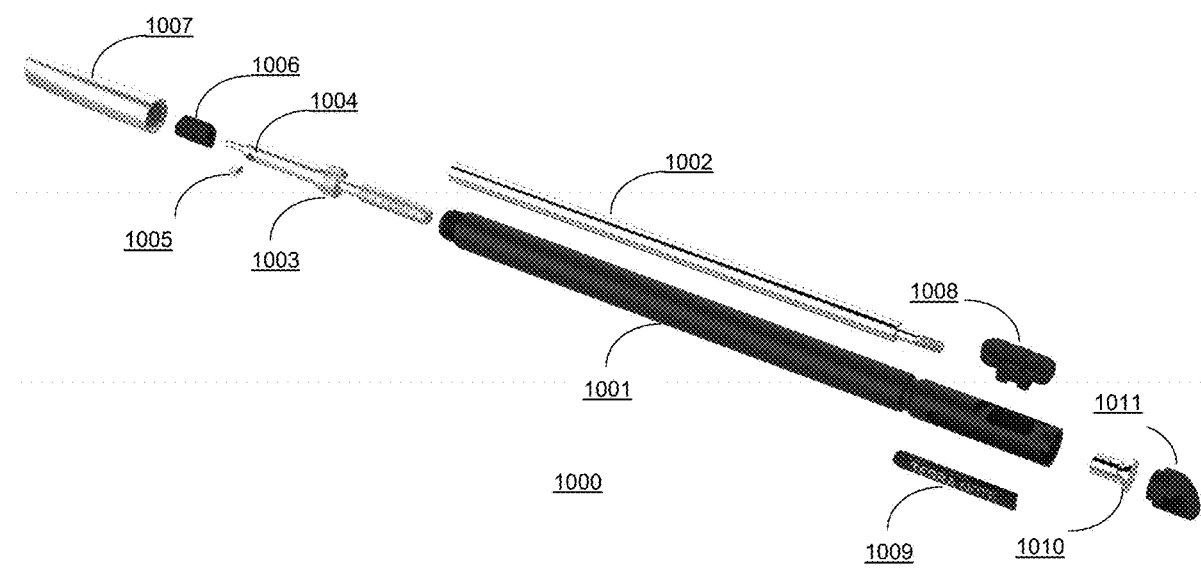
FIG. 4 is a diagram of the individual components of an exemplary stylus input device in accordance with one embodiment of the present invention.
Figure 5:
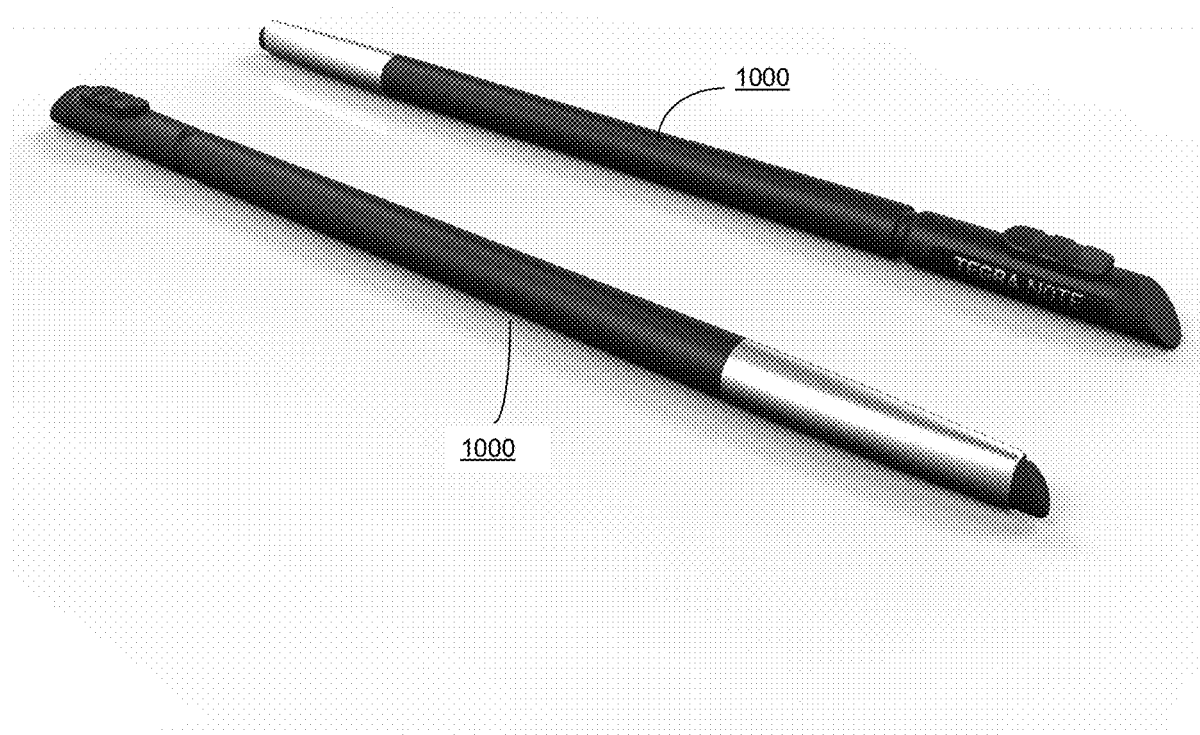
FIG. 5 is a diagram of an exemplary stylus input device with a chisel tip.

With reference now to FIG. 4, a diagram of exemplary components of the stylus input device 1000 is depicted in exploded view, in accordance with one embodiment. While stylus input device 1000 is shown as incorporating specific, enumerated features, it is understood that embodiments are well suited to applications involving additional, fewer, or different features or arrangements.

As shown, passive stylus input device 1000 includes thin annular body 1001 comprising a first threaded end and a second end. Metal rod 1002 is fully inserted into thin annular body 1001 and comprises a male threaded end and a female threaded end. Metal rod 1002 gives support to various components of the stylus device and also provides weight and balance to enhanced user comfort. Metal tip 1003 comprises a male (protruding) end and a male threaded end and is inserted into thin annular body 1001 where it is coupled to the female threaded end of metal rod 1002. Metal tip 1003 further comprises magnet housing 1004. Magnet 1005 is inserted into the magnet housing 1004 of metal tip 1003 and allows computer system devices to recognize the absence or presence of the stylus input device 1000. This is useful for providing feedback to the user when the stylus input device 1000 is removed from a device or inserted for storage.

Conductive silicon tip 1006 (chisel or round tip, for instance) is disposed on the male end of metal tip 1003. Tip housing 1007 comprises a tapered end and a threaded end and is placed over small conductive silicon tip 1006 and metal tip 1003. The threaded end of tip housing 1007 is coupled to the threaded end of thin annular body 1001. A portion of small conductive silicon tip 1006 protrudes from the end and is kept in place by tip housing 1007. Metal cap 1010 is coupled to the male threaded end of metal rod 1002 and disposed within the second end of thin annular body 1001. Large conductive silicon tip 1011 is coupled to metal cap 1010 and protrudes from the second end of thin annular body 1001. Name plate 1009 and tactile raised surface 1008 are both disposed in thin annular body 1001 near the second end.

Figure 6A:
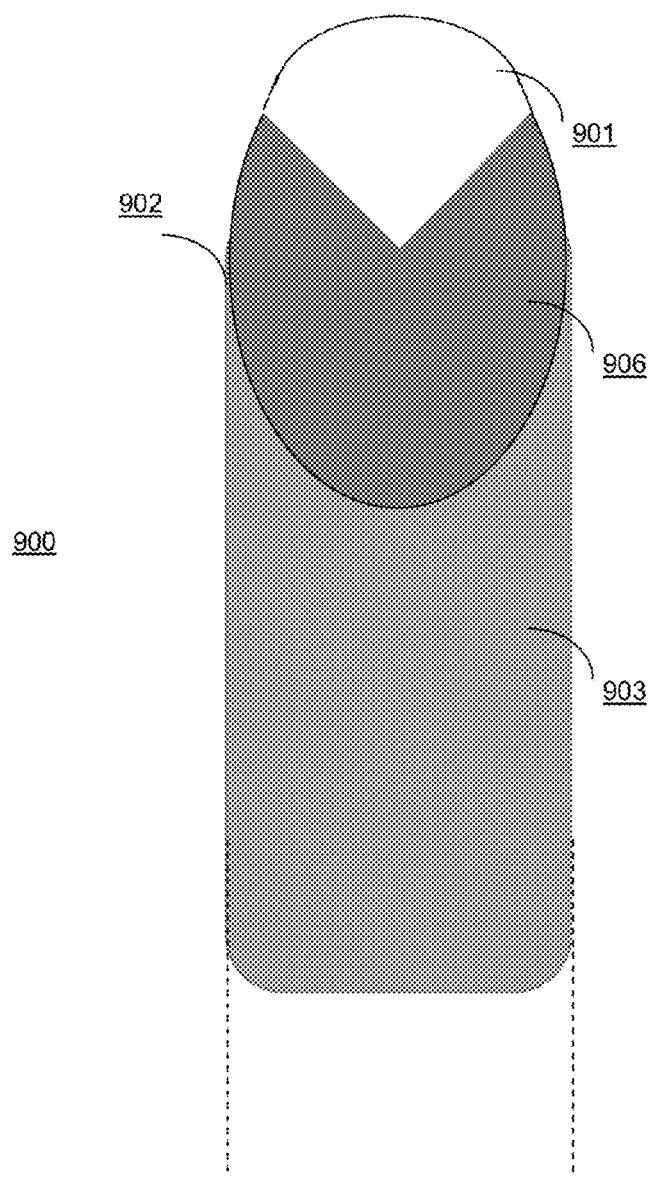
FIG. 6A is a diagram of an exemplary large conductive silicon tip, according to one embodiment of the present invention.

With reference now to FIG. 6A, a diagram of an exemplary end of a stylus input device 900 is depicted, in accordance with one embodiment. While the stylus input device 900 is shown as incorporating specific, enumerated features, it is understood that embodiments are well suited to applications involving additional, fewer, or different features or arrangements.

As shown, stylus input device 900 comprises second end 903 having a distinct tip design combining conductive and non-conductive material with a unique interface pattern or shape. The combination is intended to provide a unique input detection pattern for the touch screen so it can quickly recognize that the second end 903 of the stylus is being used by the writer as opposed to the first tip. For instance, the second end 903 may be associated with a special function, e.g., electronic erasure. In this example, a "Pac-Man" shape is employed, but any unique shape could be used.

More specifically, large conductive tip 902 of FIG. 6A is coupled to the second end 903 and comprises a non-conductive cutaway portion 901 within an otherwise conductive silicon tip portion 906. In this particular embodiment, non-conductive cutaway 901 is a combination of an oval shape and a triangular shape. Because non-conductive cutaway 901 is non-conductive, this portion of the tip will not be recognized as input by capacitive touch screen devices. The distinctive "Pac-Man" shape of large conductive tip 902 makes large conductive tip 902 easier to distinguish from other sources of input, such as small conductive tip 203 (disclosed in FIG. 2), for example, as detected by the touchscreen device. Other distinctive shapes of non-conductive cutaways may also be used. For example, the non-conductive cutaway may be a rectangular shape, an oval shape, or any combination of a rectangular shape and an oval shape.

Figure 6B:
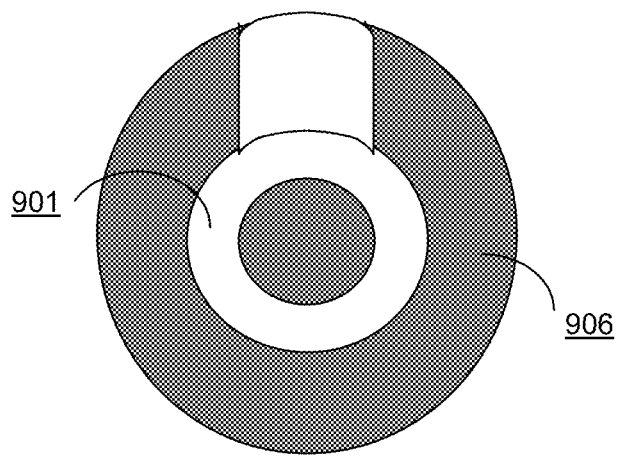
FIGS. 6B, 6C, and 6D are diagrams of exemplary large conductive silicon tips with non-conductive silicon cutaways of varying size and shape, according to embodiments of the present invention.

FIG. 6B depicts an exemplary end of a stylus input device 900 with a rectangular and doughnut shaped non-conductive cutaway portion 901.

Figure 6C:
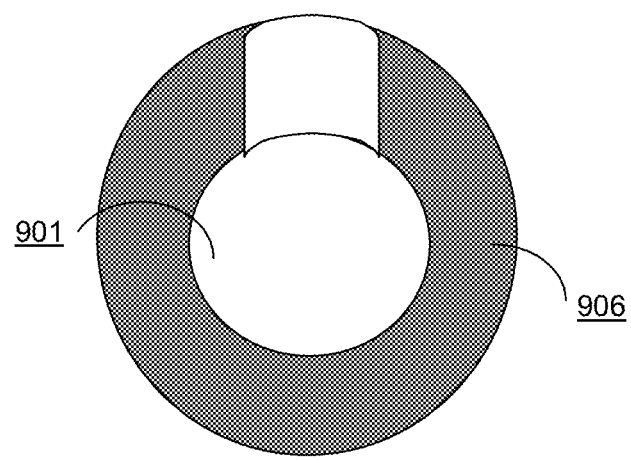

FIG. 6C depicts an exemplary end of a stylus input device 900 with a rectangular and round shaped non-conductive cutaway portion 901.

Figure 6D:
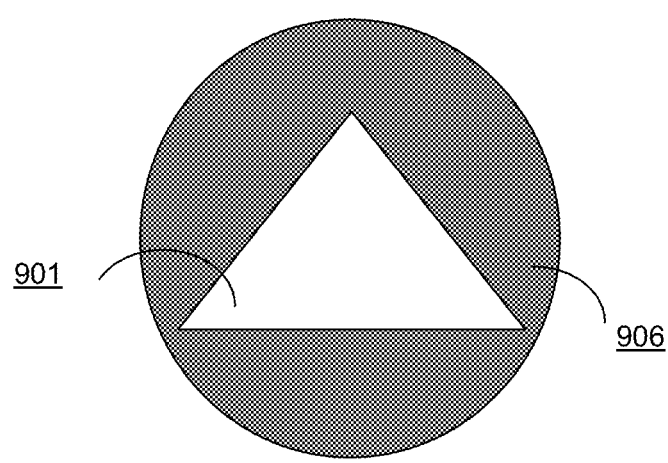

FIG. 6D depicts an exemplary end of a stylus input device 900 with a triangular shaped non-conductive cutaway portion 901.

Stylus with Conductive Silicon Deformable Chisel Tip

The conductive silicon chisel tip disclosed herein is capable of interacting with a capacitive touchscreen device via mutual capacitance such that contact with the conductive silicon alters the mutual coupling between row and column electrodes. These electrodes are scanned at the touchscreen device and variations in coupling are interpreted as input. The conductive silicon chisel tip is formed from a rubberized material and intended for use with modern touchscreen devices comprising high resolution digitizers capable of recognizing slight variations in contact area with a capacitive input device.

The rubberized material (conductive silicon) allows the tip to deform as force is applied to the stylus input device, causing pressure between the chisel tip and the writing surface, e.g., touch screen. In general, the contact area on the surface between the chisel tip and the writing surface increases as more force is applied. This contact area is sent to the processor of the touchscreen device and is used to calculate the line weight as an output. In this way, the user is able to achieve line-weight variability on-the-fly with no need to adjust the pen or change settings in software. For example, when the user is applying a regular force (the typical force used when writing with a pen or pencil) to the stylus input device, the conductive silicon tip will slightly deform and a normally weighted line will be rendered by the touchscreen. If the user applies a very light force to the stylus input device, the tip will deform less and a lightly-weighted line will be rendered by the touchscreen. If the user applies a strong force to the stylus input device, the tip will deform more and a heavily-weighted line will be rendered by the touchscreen.

It is appreciated that the angle and/or tilt of the stylus will also vary the contact area during writing as the chisel tip has a varied shape. According to some embodiments, the conductive silicon chisel tip is narrowest at the 1 mm tip, and broadest at its midpoint, where it is about 2 mm wide. The conductive silicon chisel tip is between 5 and 6 mm long. Changing the orientation of the pen (writing angle, tilt, etc.) will alter the line-weight or contact area detected by the touchscreen device due to the fact that some areas of the chisel tip are sloped greater than other areas (see FIG. 12A). The user may achieve a very lightly-weighted line by causing contact with only the very edge or very tip of the conductive silicon chisel tip.

Therefore, in accordance with embodiments of the present invention, the contact area of the writing surface by the tip can be varied by: 1) application of pressure by the stylus; and/or 2) writing orientation of the stylus.

Figure 7A:
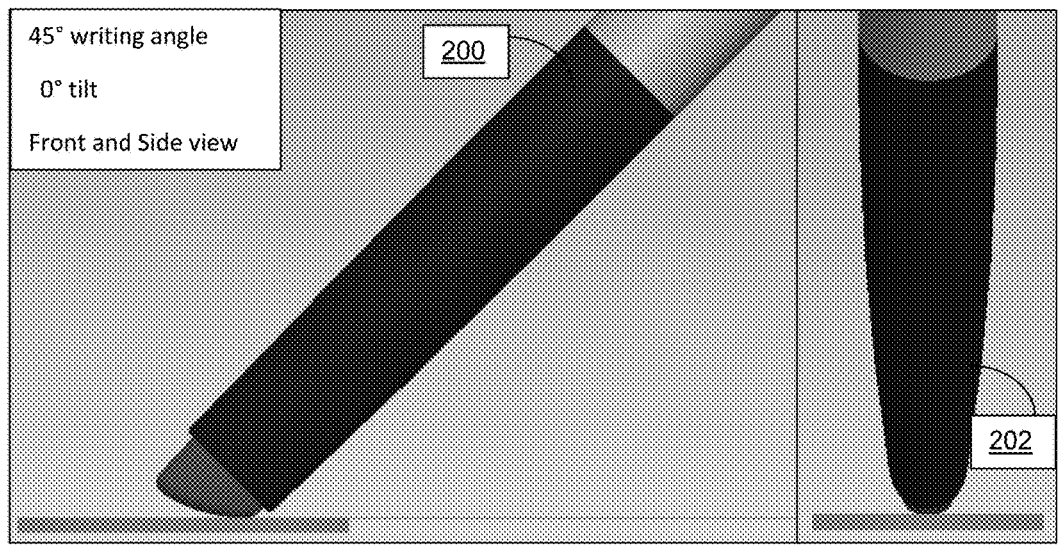
FIG. 7A is a diagram of an exemplary passive stylus input device with a chisel tip held at a 45° writing angle with no tilt.
Figure 7B:
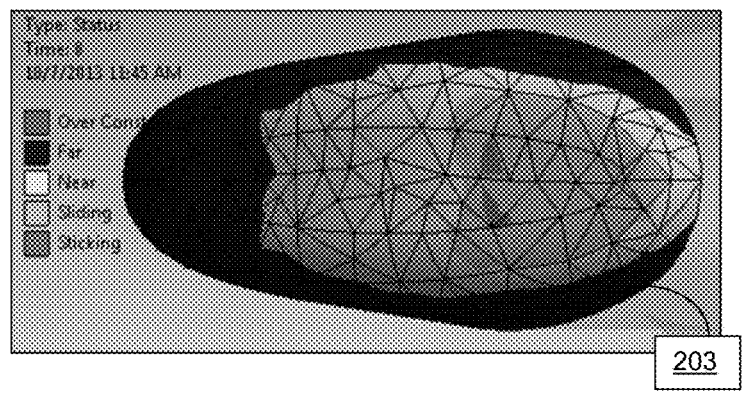
FIG. 7B is a diagram of an exemplary contact area observed with a chisel tip held at a 45° writing angle with no tilt, according to embodiments of the present invention.

With reference now to FIG. 7A and FIG. 7B, diagrams of the detectable surface area between a surface and a conductive silicon tip of an exemplary stylus input device are depicted, in accordance with one embodiment. As depicted in FIG. 7A, the stylus input device with chisel tip is held at a 45° writing angle relative to the horizontal surface and with zero tilt relative to the vertical plane. In this orientation, the stylus input device is operable to interface with a touch a sensitive surface in such a way that a surface area as depicted in FIG. 7B is detected at the touch screen.

Figure 8A:
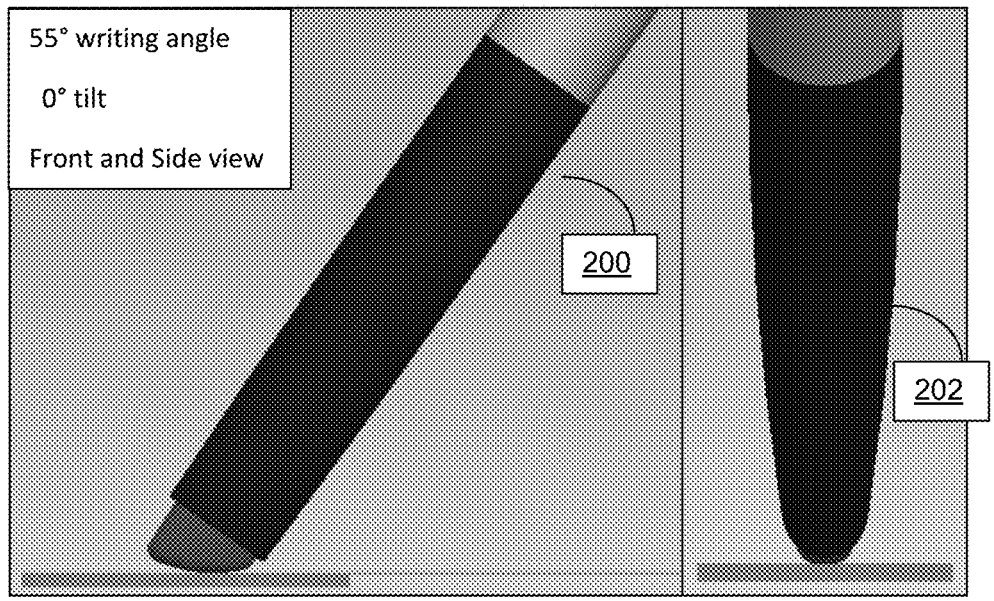
FIG. 8A is a diagram of an exemplary passive stylus input device with a chisel tip held at a 55° writing angle with no tilt.
Figure 8B:
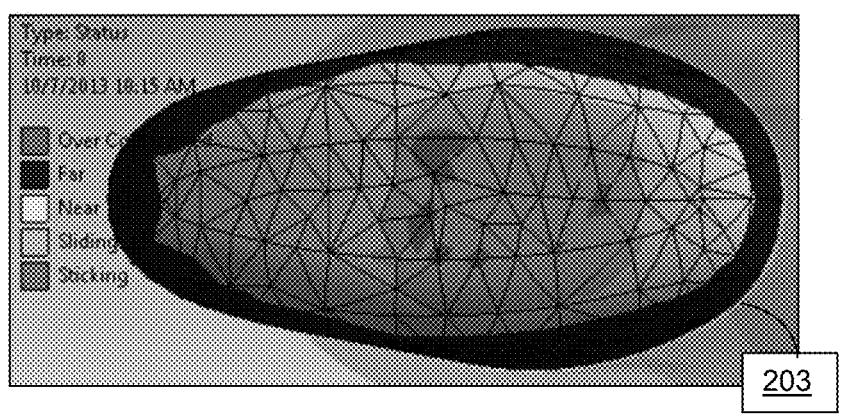
FIG. 8B is a diagram of an exemplary contact area observed with a chisel tip held at a 55° writing angle with no tilt, according to embodiments of the present invention.

With reference now to FIGS. 8A and 8B, diagrams of the detectable surface area between a surface and a conductive silicon tip of an exemplary stylus input device are depicted, in accordance with one embodiment. As depicted in FIG. 8A, the stylus input device is held at a 55° writing angle relative to the horizontal surface and with zero tilt relative to the vertical plane. In this orientation, the stylus input device is operable to interface with a touch a sensitive surface in such a way that a surface area as depicted in FIG. 8B is detected at the touch screen.

Figure 9A:
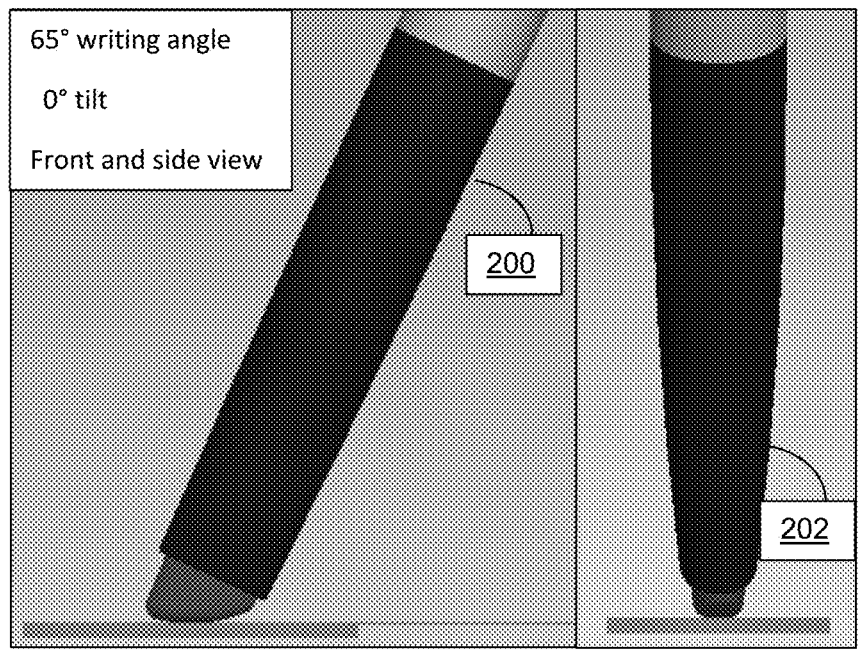
FIG. 9A is a diagram of an exemplary passive stylus input device with a chisel tip held at a 65° writing angle with no tilt.
Figure 9B:
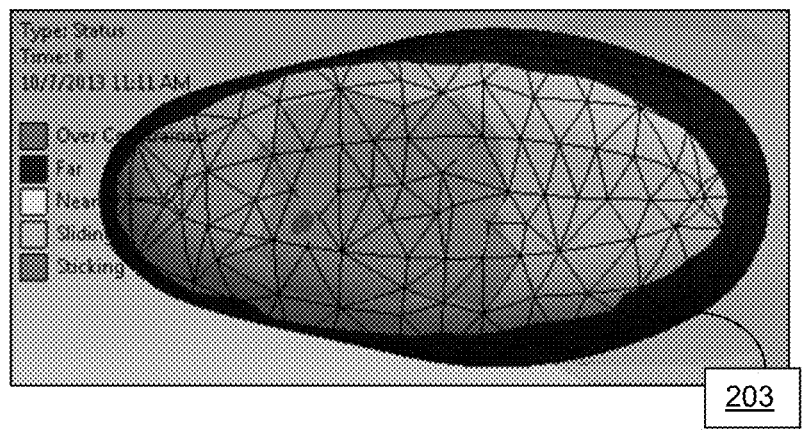
FIG. 9B is a diagram of an exemplary contact area observed with a chisel tip held at a 65° writing angle with no tilt, according to embodiments of the present invention.

With reference now to FIGS. 9A and 9B, diagrams of the detectable surface area between a surface and a conductive silicon tip of an exemplary stylus input device are depicted, in accordance with one embodiment. As depicted in FIG. 9A, the stylus input device is held at a 65° writing angle relative to the horizontal surface and with zero tilt relative to the vertical plane. In this orientation, the stylus input device is operable to interface with a touch a sensitive surface in such a way that a surface area as depicted in FIG. 9B is detected at the touch screen.

Figure 10A:
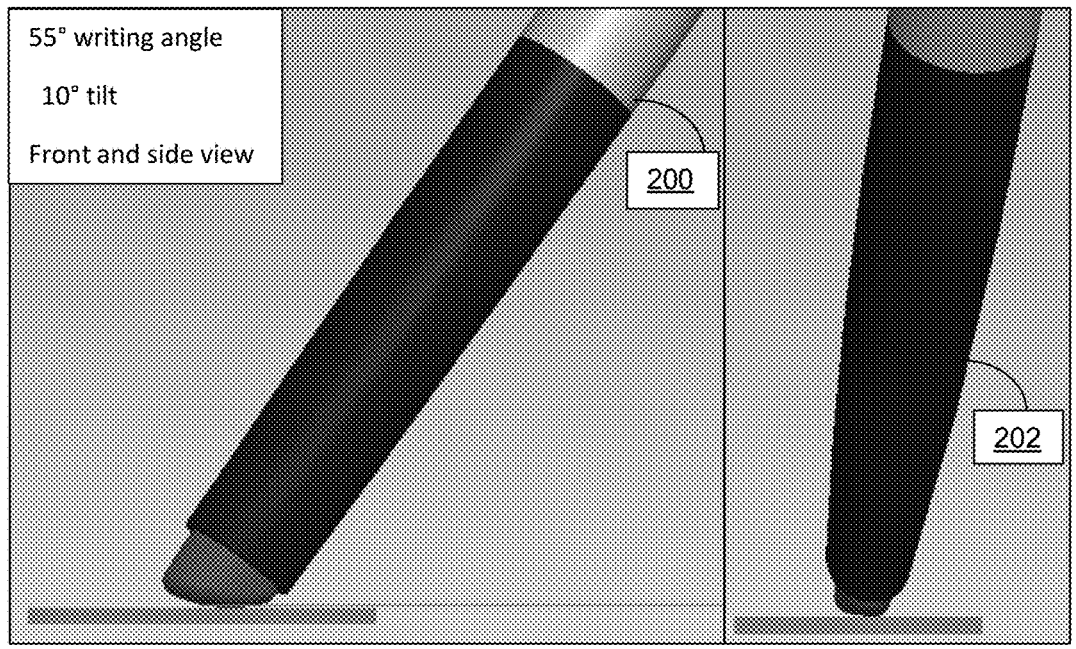
FIG. 10A is a diagram of an exemplary passive stylus input device with a chisel tip held at a 55° writing angle with 10° tilt.
Figure 10B:
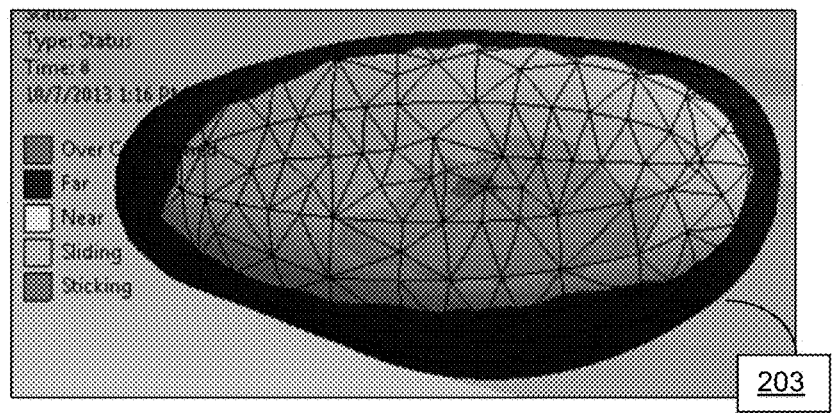
FIG. 10B is a diagram of an exemplary contact area observed with a chisel tip held at a 55° writing angle with 10° tilt, according to embodiments of the present invention.

With reference now to FIGS. 10A and 10B, diagrams of the detectable surface area between a surface and a conductive silicon tip of an exemplary stylus input device are depicted, in accordance with one embodiment. As depicted in FIG. 10A, the stylus input device is held at a 55° writing angle relative to the horizontal surface and with 10° tilt relative to the vertical plane. In this orientation, the stylus input device is operable to interface with a touch a sensitive surface in such a way that a surface area as depicted in FIG. 10B is detected at the touch screen.

Figure 11A:
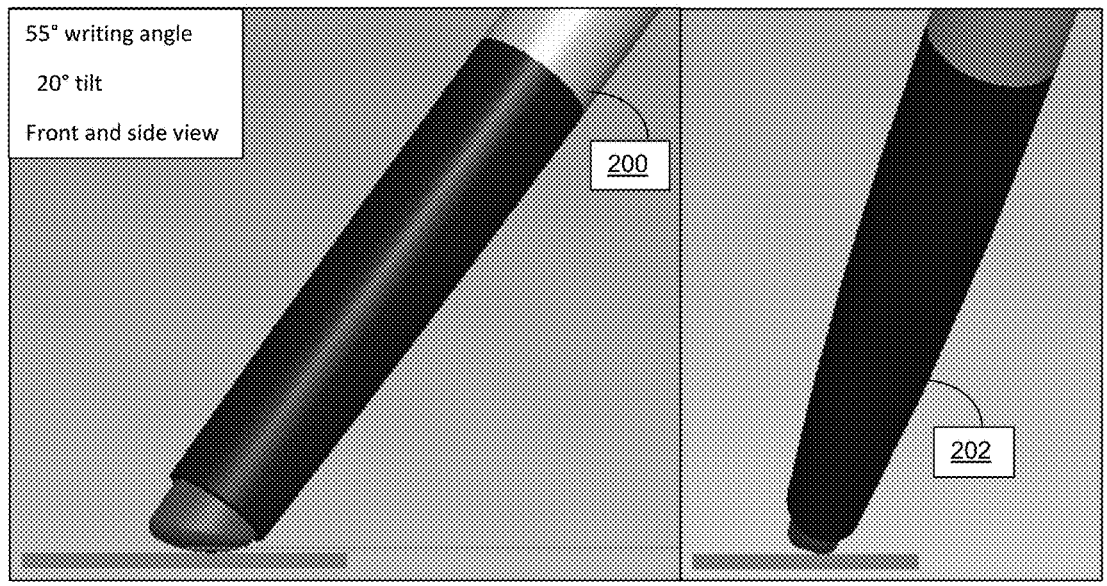
FIG. 11A is a diagram of an exemplary passive stylus input device with a chisel tip held at a 45° writing angle with 20° tilt.
Figure 11B:
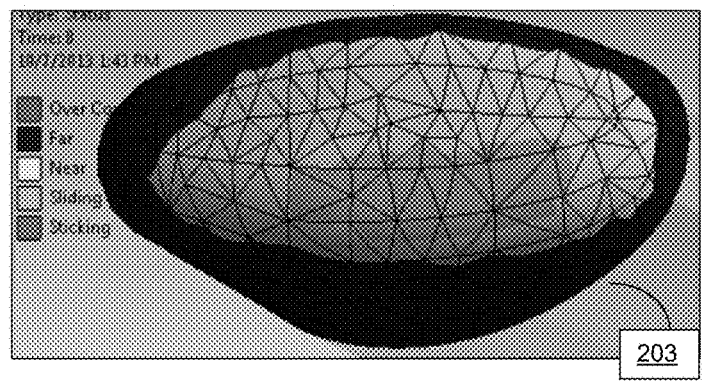
FIG. 11B is a diagram of an exemplary contact area observed with a chisel tip held at a 45° writing angle with 20° tilt, according to embodiments of the present invention.

With reference now to FIGS. 11A and 11B, diagrams of the detectable surface area between a surface and a conductive silicon tip of an exemplary stylus input device are depicted, in accordance with one embodiment. As depicted in FIG. 11A, the stylus input device is held at a 55° writing angle relative to the horizontal surface and with 20° tilt relative to the vertical plane. In this orientation, the stylus input device is operable to interface with a touch a sensitive surface in such a way that a surface area as depicted in FIG. 11B is detected at the touch screen.

Figure 12A:
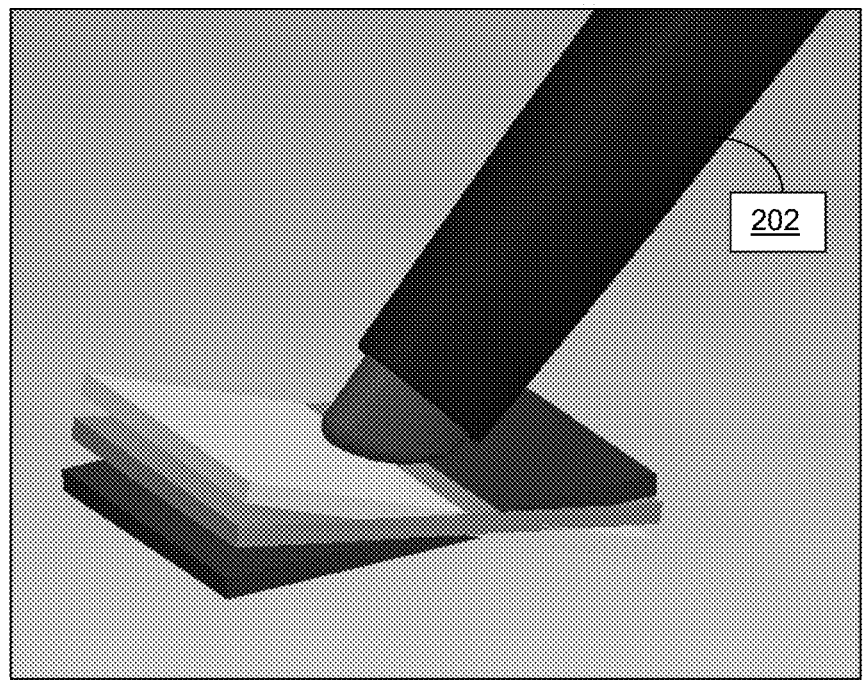
FIGS. 12A and 12B are diagrams of an exemplary passive stylus input device with a chisel tip held at various writing angles and tilts.
Figure 12B:
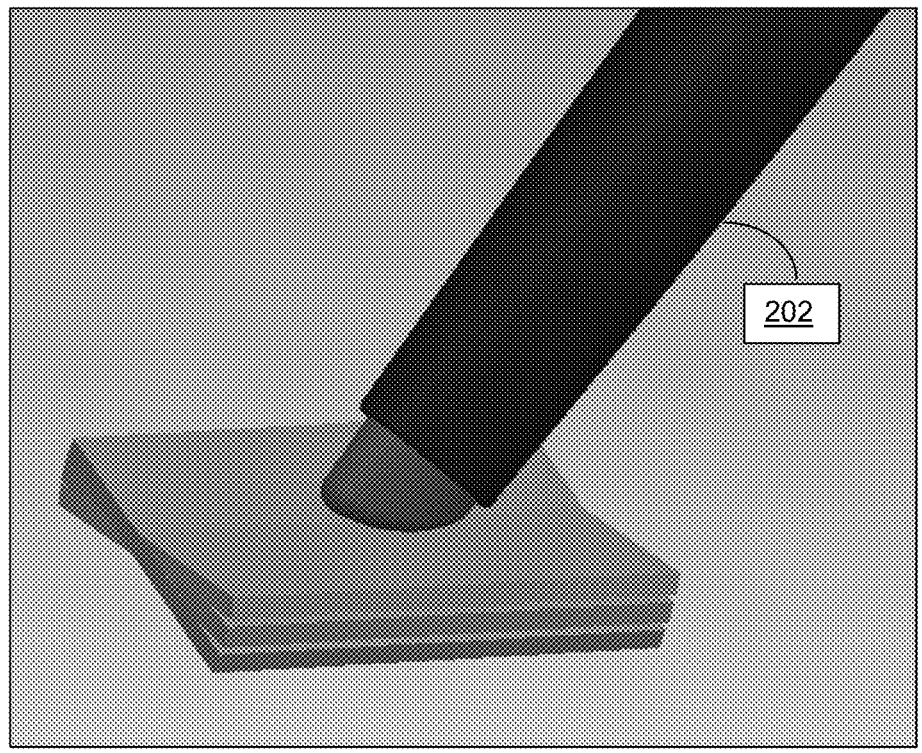

With reference now to FIGS. 12A and 12B, diagrams of the geometric features of an exemplary stylus chisel tip are depicted, in accordance with one embodiment. As depicted in FIG. 12A, the stylus chisel tip is gradually sloped from back to front. The area furthest back on the tip, referred to as the back-hill, is sloped the least relative to the horizontal surface. In the embodiment depicted in FIG. 12A, when the stylus input device is held 55° relative to the horizontal surface, the back-hill is sloped 45° relative to the horizontal surface, the normal area of the tip is sloped 55° relative to the horizontal surface, and the very front area of the tip is sloped 65° relative to the horizontal surface. As the writing angle of the stylus input device changes, the angles of these areas of the tip relative to the horizontal surface will change. However, the relationship between the angles of the areas will remain constant unless the tip is deformed by pressure created between the tip and the writing surface. As depicted in FIG. 12B, the stylus input device is held with zero tilt relative to the vertical plane. When the orientation of the pen changes such that there is a 10° or 20° tilt relative to the vertical plane, the contact area between the horizontal surface and the conductive silicon tip is diminished.

Figure 13A:
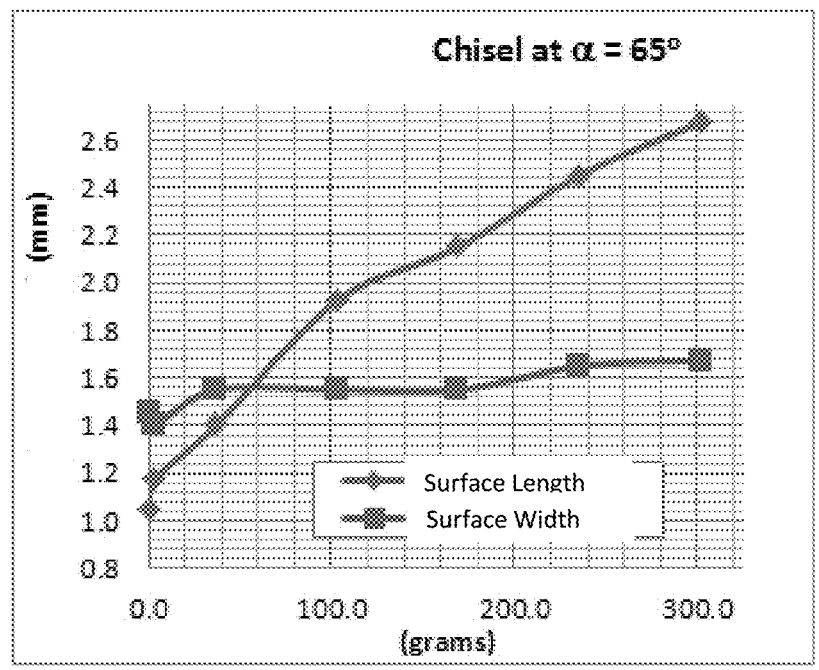
FIGS. 13A and 13B are graphs of exemplary surface length and widths of the contact area between the touchscreen and the chisel tip measured in millimeters under different loads, according to embodiments of the present invention.
Figure 13B:
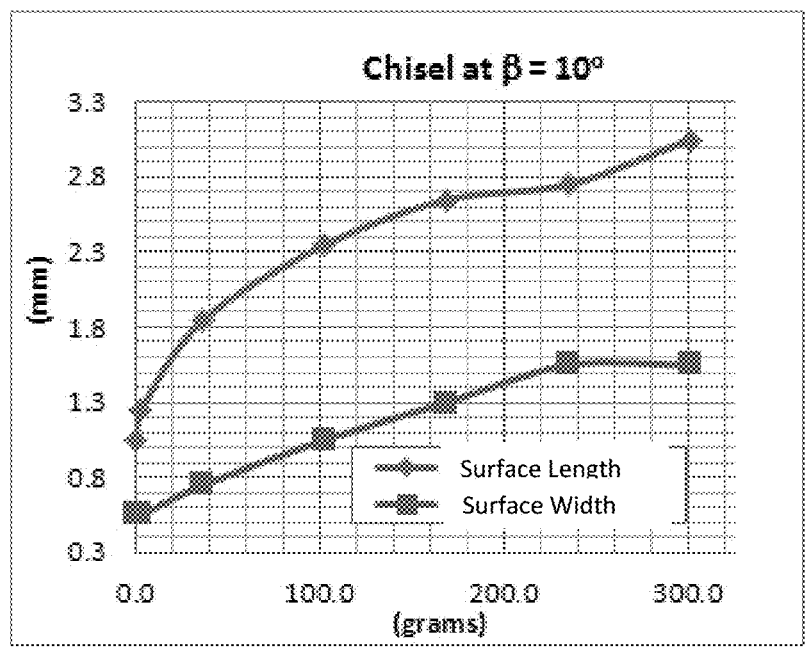

With reference now to FIGS. 13A and 13B, exemplary graphs of the surface length and widths of the contact area between the touchscreen and the chisel tip measured in millimeters are provided, in accordance with one embodiment. The graphs represent the surface length and width along the y-axis observed when a load ranging from 0 to 300 grams is applied to the stylus. FIG. 13A represents the surface length and width observed when the stylus is held at a writing angle of 65° with no tilt. FIG. 13B represents the surface length and width observed when the stylus is held at a writing angle of 55° with 10° tilt.

Figure 14:
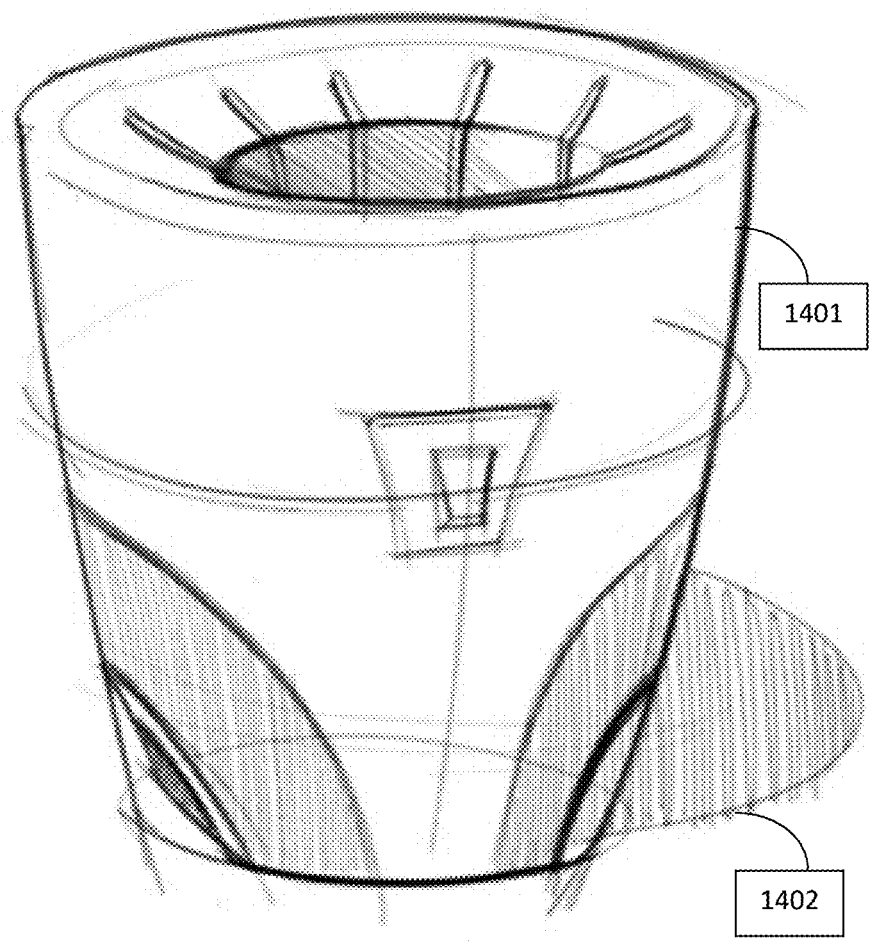
FIG. 14 is a sketch created on a display screen with touch sensor using a stylus having a conductive silicon tip, in accordance with one according to embodiments of the present invention.

With reference now to FIG. 14, on-screen sketch created on a touch display with a stylus having a conductive silicon tip is depicted, in accordance with one embodiment. The contact area of the writing surface by the tip can be varied by: 1) application of pressure by the stylus; and/or 2) writing orientation of the stylus. This contact area is sent to the processor of the touchscreen device and is used to calculate the line weight as an output. In this way, the user is able to achieve line-weight variability on-the-fly with no need to adjust the pen or change settings in software. For example, heavy line 1401 is produced by a stroke having heavy pressure, according to some embodiments. Thin line 1402 is produced by a stroke having only light pressure, according to some embodiments.

According to some embodiments, the conductive silicon chisel tip disclosed herein is a typical conductive silicon material. In some embodiments, the conductive silicon chisel tip is formed from thermoplastic elastomers (TPE) or thermoplastic rubbers (TPR). In other embodiments, the conductive silicon chisel tip is formed from a material having a hardness of 80 A, but other hardness degrees can be utilized. In some embodiments, the conductive silicon chisel tip is formed from a material having a hardness between 40 A and 50 D. In other embodiments, the conductive silicon chisel tip is coated with an anti-friction coating to allow better writing operation.

Stylus with Conductive Silicon Deformable Round Tip

The conductive silicon round tip or "fine tip" disclosed herein is capable of interacting with a capacitive touchscreen device via mutual capacitance such that contact with the conductive silicon alters the mutual coupling between row and column electrodes. These electrodes are scanned at the touchscreen device and variations in coupling are interpreted as input. The conductive silicon fine tip is formed from a rubberized material and intended for use with modern touchscreen devices comprising high resolution digitizers capable of recognizing slight variations in contact area with a capacitive input device. Although the fine silicon tip is designed to feel sharp and stiff, the rubberized material allows the tip to deform slightly as force is applied to the stylus input device, causing pressure between the round tip and the writing surface.

The fine tip is of a generally rounded writing end, symmetrical about its center, unlike the chisel tip. In general, the contact area between the fine tip and the writing surface increases as more force is applied. This contact area is sent to the processor of the touchscreen device and is used to calculate the line weight as an output. In this way, the user is able to achieve line-weight variability on-the-fly with no need to adjust the pen or change settings in software. For example, when the user is applying a regular force (the typical force used when writing with a pen or pencil) to the stylus input device, the conductive silicon tip will slightly deform and a normally weighted line will be rendered by the touchscreen. If the user applies a very light force to the stylus input device, the tip will deform less and a lightly-weighted line will be rendered by the touchscreen. If the user applies a strong force to the stylus input device, the tip will deform more and a heavily-weighted line will be rendered by the touchscreen.

The conductive silicon round tip is about 2 mm wide in one embodiment at its widest point and rounded at the tip, but the size can vary within embodiments of the present invention. This size is roughly equivalent to the tip of a typical ballpoint pen or pencil and gives the user a feeling of accuracy and precision. The round tip is much smaller than the width of an average finger, so touchscreen interaction is improved in many respects. When using a fine tip input device, it is much easier for a user to select between two objects or keys that are close together on the screen. It is also much easier to draw fine lines and add details to sketches and drawings. Furthermore, the compact size of the fine tip offers greater visibility, allowing the user to observe the results of the input as he interacts with the device. Prior art input devices featuring large (5.5-8 mm) tips often obscure the point of interaction such that a user cannot both interact and observe the results of the interaction at the same time.

According to some embodiments, the conductive silicon fine tip disclosed herein is a typical conductive silicon material. In some embodiments, the conductive silicon fine tip may formed from thermoplastic elastomers (TPE) or thermoplastic rubbers (TPR). In other embodiments, the conductive silicon round tip is formed from a material having a hardness of about 80 A, but of course other hardness degrees could be used. In some embodiments, the conductive silicon round tip is formed from a material having a hardness between 40 A and 50 D. In other embodiments, the conductive silicon round tip is coated with an anti-friction coating.

Embodiments of the present invention are thus described. While the present invention has been described in particular embodiments, it should be appreciated that the present invention should not be construed as limited by such embodiments, but rather construed according to the following claims.

What is claimed is:

1. A passive stylus comprising: a thin annular body configured to be hand-held and comprising a first end and a second end; a chisel shaped tip disposed at said first end of said body, said chisel shaped tip comprising a deformable material, wherein said chisel shaped tip is operable to interface with a touch sensitive surface with a first detectable surface area when a first pressure is exerted on said body and translated to said chisel shaped tip and wherein said chisel shaped tip is operable to interface with said touch sensitive surface with a second detectable surface area, different from said first detectable surface area, when a second pressure is exerted on said body and translated to said chisel shaped tip; and a second tip disposed on said second end of said body, wherein said second tip comprises a contact surface, said contact surface comprising: a first conductive rubberized material; and a second rubber material that is non-conductive, wherein said first conductive rubberized material and second rubber material are operable for directly interfacing with said touch sensitive surface when said contact surface of said second tip is positioned thereon forming a detection pattern for detection by said touch sensitive surface for identifying said second tip and for implementing a function associated therewith.

2. A stylus as described in claim 1, wherein said deformable material is a conductive silicon based rubber.

3. A stylus as described in claim 2, wherein said chisel shaped tip further comprises an exterior coating of anti-friction material.

4. A stylus as described in claim 2, wherein said chisel shaped tip further comprises a magnet.

5. A stylus as described in claim 1, wherein said chisel shaped tip is rigidly attached to said body.

6. A stylus as described in claim 1, wherein said first pressure is less than said second pressure and wherein further said first detectable surface area is less than said second detectable surface area.

7. A stylus as described in claim 1, wherein said chisel shaped tip is substantially within the range of 0.5 mm to 1.5 mm in thickness.

8. A stylus as described in claim 1, wherein said chisel shaped tip comprises:
a thin writing edge for interfacing at a first writing angle of said body with said touch sensitive surface with a thin detectable surface area; and
a thick writing surface adjacent to said thin writing edge, said thick writing surface for interfacing at a second writing angle of said body with said touch sensitive surface with a thick detectable surface area larger than said thin detectable surface area.

9. A stylus as described in claim 1, wherein said chisel shaped tip is operable to be used for generating graphically rendered writings by interfacing with said touch sensitive surface of an electronic device and wherein further said second tip is operable to be used for electronically erasing graphically rendered writings by interfacing with said touch sensitive surface.

10. A passive stylus structure, comprising: a tube; a metal rod disposed within the tube; a metal tip holder coupled to a first and of the metal rod; a chisel shaped tip comprising a deformable conductive material coupled to the metal tip holder, wherein said chisel shaped tip is for interacting with a touch sensitive display device of a computer system; a tip housing covering a portion of the chisel shaped tip and coupled to a first end of the tube, wherein the tip housing holds the chisel shaped tip in place; a cap disposed within a second end of the tube and coupled to a second end of the metal rod; and a second Up coupled to said cap, wherein said second tip comprises a contact surface, said contact surface comprising: a first conductive rubberized material; and a second rubber material that is non-conductive, wherein said first conductive rubberized material and second rubber material are operable for directly interfacing with said touch sensitive display device when said contact surface of said second tip is positioned thereon forming a detection pattern for detection by said touch sensitive display device for identifying said second tip and for implementing a function associated therewith.

11. The passive stylus structure of claim 10, wherein said deformable material is a conductive silicon based rubber.

12. A stylus structure as described in claim 10, wherein said tube is hollow and further comprising a raised tactile grip disposed on the side of the hollow tube.

13. A passive stylus, comprising: a rod; a chisel shaped Up comprising a deformable material coupled to a first end of the rod for causing a first action when brought in contact with a touch sensitive surface; and a second tip coupled to a second end of the rod, said second tip for causing a second action when brought in contact with a touch sensitive surface, wherein said second tip comprises a contact surface, said contact surface comprising: a first conductive rubberized material; and a second rubber material that is non-conductive, wherein said first conductive rubberized material and second rubber material are operable for directly interfacing with said touch sensitive surface when said contact surface of said second tip is positioned thereon forming a detection pattern for detection by said touch sensitive surface for identifying said second tip and for implementing a function associated therewith.

14. The passive stylus of claim 13, wherein said deformable material is a conductive silicon based rubber.

15. The passive stylus of claim 13, wherein said first action comprises generating graphically rendered writings in accordance with a position of said chisel shaped tip on said touch sensitive surface and wherein further said second action comprises electronically erasing graphically rendered writings in accordance with a position of said second tip on said touch sensitive surface.

16. The passive stylus of claim 13, wherein said second tip comprises a conductive region and a non-conductive region.

17. The passive stylus of claim 13, further comprising a magnet disposed within the rod.

18. The passive stylus of claim 13, wherein said chisel shaped tip further comprises an exterior coating of anti-friction material.

19. A passive stylus comprising:
a thin annular body configured to be hand-held and comprising a first end; and
a tip disposed on said first end of said body, wherein said tip comprises a contact surface, said contact surface comprising:
a first material that is conductive; and
a second material that is non-conductive, wherein said first and second materials are operable for directly interfacing with a touch sensitive surface when said contact surface of said tip is positioned thereon forming a detection pattern for detection by said touch sensitive surface for identifying said tip and for implementing a function associated therewith.

20. The passive stylus of claim 19, wherein said first and second materials comprise deformable silicon based rubber.

21. The passive stylus of claim 20, wherein said tip is operable to interface with a touch a sensitive surface with a first detectable surface area when a first pressure is exerted on said tip and wherein said tip is operable to interface with said touch sensitive surface with a second detectable surface area, different from said first detectable surface area, when a second pressure is exerted on said tip.

22. The passive stylus of claim 21, wherein said first pressure is less than said second pressure and wherein further said first detectable surface area is less than said second detectable surface area.

23. The passive stylus of claim 19, wherein said tip further comprises an exterior coating of anti-friction material.

24. The passive stylus of claim 19, wherein said tip further comprises:
a thin writing edge for interfacing at a first writing angle of said body with said touch sensitive surface with a thin detectable surface area; and
a thick writing surface adjacent to said thin writing edge, said thick writing surface for interfacing at a second writing angle of said body with said touch sensitive surface with a thick detectable surface area larger than said thin detectable surface area.

\* \* \* \* \*